(12) United States Patent
Wallgren et al.

(10) Patent No.: US 12,291,478 B2
(45) Date of Patent: May 6, 2025

(54) GLASS FORMING MACHINE COMPRISING A SWABBING DEVICE AND METHOD

(71) Applicant: Emhart Glass SA, Steinhausen (CH)

(72) Inventors: Erik Joakim Wallgren, Sundsvall (SE); Martin Grönblad, Sundsvall (SE); Carlos David Bermudez, Medellin (CO)

(73) Assignee: Emhart Glass SA (CH)

( * ) Notice: Subject to any disclaimer, the term of this patent is extended or adjusted under 35 U.S.C. 154(b) by 373 days.

(21) Appl. No.: 17/853,161

(22) Filed: Jun. 29, 2022

(65) Prior Publication Data

US 2023/0040726 A1    Feb. 9, 2023

(30) Foreign Application Priority Data

Aug. 5, 2021  (EP) ..................................... 21189761

(51) Int. Cl.
*C03B 40/027*  (2006.01)
*C03B 19/02*  (2006.01)

(52) U.S. Cl.
CPC .......... *C03B 40/027* (2013.01); *C03B 19/025* (2013.01)

(58) Field of Classification Search
CPC .............................. C03B 40/027; C03B 40/02
See application file for complete search history.

(56) References Cited

U.S. PATENT DOCUMENTS

| | | | | |
|---|---|---|---|---|
| 3,623,856 A * | 11/1971 | Keller | ................... | C03B 9/3875 65/262 |
| 4,004,906 A | 1/1977 | Rowe | | |
| 4,391,620 A * | 7/1983 | Geisel | ....................... | C03B 7/16 65/170 |
| 4,409,010 A * | 10/1983 | Brown | .................. | C03B 40/027 65/262 |
| 4,579,574 A * | 4/1986 | Sugie | .................... | C03B 40/027 65/262 |
| 4,765,821 A * | 8/1988 | Doud | ...................... | C03B 9/406 65/169 |
| 4,816,057 A | 3/1989 | Pinkerton et al. | | |

(Continued)

FOREIGN PATENT DOCUMENTS

| | | |
|---|---|---|
| DE | 102014115372 A1 | 4/2016 |
| EP | 0035145 A1 | 9/1981 |

(Continued)

OTHER PUBLICATIONS

European Search Report for EP Application No. 21189761.6, dated Feb. 4, 2022, 5 pages.

*Primary Examiner* — Erin Snelting
*Assistant Examiner* — Steven S Lee
(74) *Attorney, Agent, or Firm* — Dickinson Wright PLLC

(57) ABSTRACT

A glass forming machine, a method for lubricating a baffle and a swabbing device for a glass forming machine is disclosed. The glass forming machine comprises a blank station with a blank mould for forming a parison from a gob of molten glass inside the blank mould. The glass forming machine further comprises a baffle for closing the blank mould. The glass forming machine further comprises a swabbing device which is configured to spray lubricant onto the baffle for lubricating the baffle. This enables a particularly high quality of the formed parisons and the corresponding glass containers.

12 Claims, 4 Drawing Sheets

(56) References Cited

U.S. PATENT DOCUMENTS

| | | | | | |
|---|---|---|---|---|---|
| 4,861,363 | A | * | 8/1989 | Brown | C03B 40/027 |
| | | | | | 118/317 |
| 4,990,171 | A | * | 2/1991 | Kojima | C03B 40/027 |
| | | | | | 65/169 |
| 5,597,396 | A | * | 1/1997 | Tohjo | C03B 40/027 |
| | | | | | 65/169 |
| 5,746,800 | A | * | 5/1998 | Ambrogio | G07F 9/026 |
| | | | | | 427/249.1 |
| 9,212,083 | B2 | * | 12/2015 | Diehm | C03B 40/02 |
| 2009/0173105 | A1 | * | 7/2009 | Zanella | C03B 40/027 |
| | | | | | 65/159 |
| 2010/0132408 | A1 | * | 6/2010 | Billieres | C23C 4/129 |
| | | | | | 148/403 |
| 2018/0002218 | A1 | * | 1/2018 | Mobayed | C03B 40/027 |
| 2020/0255323 | A1 | * | 8/2020 | Kawahara | C03B 9/41 |
| 2020/0369548 | A1 | * | 11/2020 | Bewer | C03B 9/34 |

FOREIGN PATENT DOCUMENTS

| | | | | |
|---|---|---|---|---|
| EP | 0043261 | A1 | | 1/1982 |
| JP | H06279048 | A | * | 10/1994 |
| WO | 2007138226 | A1 | | 12/2007 |
| WO | 2017032883 | A1 | | 3/2017 |

* cited by examiner

GLASS FORMING MACHINE COMPRISING A SWABBING DEVICE AND METHOD

CROSS-REFERENCE TO RELATED APPLICATION

The present application claims priority to European Patent Application No. 21189761.6, filed on Aug. 5, 2021, the entire contents of which is incorporated herein by reference.

TECHNICAL FIELD

The present invention relates to a glass forming machine, a method for lubricating a baffle and a swabbing device for a glass forming machine.

BACKGROUND

A glass forming machine is described which includes a blank station for forming parisons from gobs of molten glass. The blank station may include a plunger and a blank mould. The plunger may be moved into a blank mould up to an end position. The plunger can be moved out of the blank mould up to a start position. The plunger can be moved from below through the neck ring into the blank mould.

The blank mould may consist of two blank mould halves. The blank mould halves may be movable back and forth between an open position and a closed position. A gob of molten glass may be fed into the blank mould from above. The blank mould is typically closed during the feeding of the gob of molten glass. The upper opening of the blank mould can be closed by a baffle.

The plunger has reached its end position when the cavity of the blank mould is completely filled with glass and a part of the plunger. There is then no more air in the blank mould. The ascending movement of the plunger can pierce a gob of molten glass when a molten gob is within the blank mould and when the upper opening of the blank mould is closed. The blank station can form a parison in this way.

After forming the parison, the plunger may be moved downwards out of the blank mould. The baffle may be removed and/or the two mould halves will be moved to their open position. The parison may then be held only by the neck ring. Then, an invert mechanism may transfer the neck ring together with the parison to the blow station. The blow station may form a finished product out of the parison. The finished product may be a container like a bottle. The above-mentioned features may be combined with the aspects listed below as well as with the embodiments thereof.

Glass forming machines having blank stations are known for example from U.S. Pat. Nos. 4,004,906 A, 4,816,057 A and DE 10 2014 115 372 A1. A major source of the visible defects on the surface of the finished product is the relatively violent contact of the parison with the surface of the blank mould cavity during charging. To eliminate these defects, document WO 2007/138226 A1 teaches to swab (lubricate) a mould. An apparatus which can swab a mould comprises a spray tube which is carried by a swab robot that can move alongside the blank mould. Swabbing of a blank mould is also known from WO 2017/032883 A1.

It is the object of the invention to increase the quality of the produced parisons at a low technical effort. The object is solved by the glass forming machine according to claim 1 and the method and the swabbing device according to the independent claims. The dependent claims refer to advantageous embodiments.

For solving the object of the invention, a glass forming machine is provided. The glass forming machine comprises a blank station with a blank mould for forming a parison from a gob of molten glass inside the blank mould. The blank station further comprises a baffle for closing the blank mould. The glass forming machine further comprises a swabbing device which is configured to spray lubricant onto the baffle for lubricating the baffle.

SUMMARY

It has been found that the quality of the parisons is even better when the baffle is lubricated. In particular the quality of the bottom region of a container such as a bottle can be increased. The lubricant application is particularly uniform and the lubrication effect is particularly good when the lubricant is sprayed. This is the case in particular in comparison to the use of brushes or wiping lubricants.

The swabbing device is a device which allows swabbing or lubricating the baffle. This is performed by spraying lubricant by means of at least one nozzle. A second nozzle is a nozzle for spraying lubricant onto the baffle. In particular, the swabbing device comprises a second nozzle. The second nozzle is in particular positioned on a front-face side of a spray bracket of the swabbing device. A nozzle generally relates to an opening or a close arrangement of several openings through which lubricant can be sprayed. The lubricant may e.g. be oil. The lubricant is preferably sprayed on the surface of the baffle which contacts the molten glass during the formation of the parison.

The baffle may be attached to a baffle moving device. The baffle moving device may serve for moving the baffle from a closing position into a parking position and back. In the closing position, the baffle closes an upper opening in the otherwise closed blank mould. The baffle is placed in the parking position when it is not used.

In one embodiment, the swabbing device is further configured to spray lubricant onto the blank mould for lubricating the blank mould. Thus, the swabbing device can be used to lubricate both the blank mould and the baffle. The lubricant is preferably sprayed on the inner surface of the blank mould which contacts the molten glass during the formation of the parison. This further increases the quality of the formed parisons. At the same time the technical effort is low, because the swabbing device performs both lubrication operations.

A first nozzle is a nozzle for spraying lubricant onto the blank mould and/or a neck ring. In particular, the swabbing device comprises a first nozzle for spraying lubricant onto the blank mould. The first nozzle and the second nozzle are different nozzles. Thus, different nozzles are used for the blank mould or the neck ring and the baffle. The first nozzle may be integrated into a spray bracket of the swabbing device. The swabbing device may comprise one or several first nozzles only. The swabbing device may comprise one or several second nozzles only.

In one embodiment, the swabbing device comprises a rod-shaped extension with a first nozzle. The extension is configured for plunging into the blank mould for spraying lubricant onto the inner wall of the blank mould. In particular, the first nozzle plunges into the blank mould. The extension may be configured to move into the blank mould when the blank mould is closed. The movement may be performed along an essentially axial direction with reference to the main extension direction of the blank mould and/or the extension. Essentially axial means that certain deviation from the axial movement is possible. For example, the movement may be a combined rotational movement around several joints of a swab robot. The inner wall is the surface of the blank mould which is contacted by the molten glass when a parison is formed.

Rod-shaped means that the extension is elongate and has a small diameter compared to its length, e.g. the ratio of diameter to length is greater than 0.01, in particular 0.05 and/or smaller than to 0.3, in particular 0.1. The extension may have an arbitrary cross-sectional shape which may be for example circular.

The first nozzle is in particular located in the region of the free end of the extension. It may be positioned on the end face and/or on the circumferential surface of the extension near the end face. The end region means a region which is on or near the free end. The extension may be held by a spray bracket as described below. The face of the spray bracket with the extension may be referred to as front face.

In particular, the first nozzle and/or the second nozzle is configured for spraying in an angled manner such that a region of the respective area can be lubricated at once. For example, a first nozzle with a spray angle, e.g. between 45 degrees and 90 degrees, may be positioned axially at the end face of the extension. The lubricant can then be sprayed not only axially but also radially and thus lubricate the circumferential inner walls of the blank mould with minimal technical effort.

In a further embodiment, the glass forming machine comprises a neck ring. The swabbing device is further configured to spray lubricant onto the neck ring for lubricating the neck ring. A neck ring serves for holding a parison and removing it out of the blank mould. This increases the quality of the parisons even further, as all contact areas between the parison and the machine are lubricated.

The first nozzle may be configured to spray lubricant onto the neck ring. Thus, only one nozzle is required for lubricating the neck ring and the blank mould which reduces the technical effort. The swabbing device may be configured to spray lubricant onto an inner surface of the neck ring by which the parison can be held and/or onto an upper surface which contacts the blank mould when the blank mould is in the open position.

In one embodiment, the swabbing device comprises a spray bracket. The spray bracket has at least one nozzle and/or a rod-shaped extension having a nozzle. Typically, the spray bracket is the central or main component of the swabbing device and/or serves for holding the spray nozzles. The spray bracket may be moveable with respect to the blank station. For this purpose, it is typically attached to a moving apparatus of the swabbing device. The swabbing device may comprise the moving apparatus. The spray bracket holds the nozzles and/or extensions for positioning them with respect to the blank mould, the blow station and/or the neck ring. The spray bracket may comprise a housing and/or a lubricant feed line. The housing may have a cuboidal shape with equal or different side lengths. The second nozzle can be positioned directly in the spray bracket, e.g. inserted in the housing of the spray bracket and/or flush with an outer housing wall of the spray bracket. This embodiment facilitates movement of the nozzle or nozzles for a particularly uniform lubrication. Thus, the quality of the parisons is increased.

In one embodiment, the glass forming machine is configured such that the baffle can be moved to an upper position vertically above the blank mould. The swabbing device may comprise on a back face of the spray bracket a second nozzle to spray lubricant onto the baffle when the baffle is in the upper position.

The position of the blank mould refers to the position when the blank mould is closed and/or to the position of the neck ring. The upper position vertically above the blank mould refers to a position which is not only on a higher height position but on essentially the same position or at least with an overlap in position in a horizontal plane. The height generally relates to a vertical direction during use as intended.

In one configuration, the swabbing device comprises on a front-face side of the spray bracket a first nozzle to spray lubricant onto the blank mould and/or onto a neck ring of the blank station. The back face and the front face face in opposite directions. The first nozzle can be arranged on a rod-shaped extension. In particular, the spray bracket can be positioned in a spraying position in which the second nozzle can spray lubricant onto the baffle and the first nozzle can spray lubricant onto the blank mould and/or the neck ring. In other words, no movement of the spray bracket is necessary between the two lubrication operations. However, a small movement, in particular a vertical movement, is not excluded. Thus, the step of lubricating the baffle does not require an additional process step or additional time. It can be integrated into the already present process for lubricating the blank mould and/or the neck ring. Therefore, no additional scrap is generated during the baffle lubrication and only containers of one cycle have to be rejected just as in the common process.

In a further embodiment, the glass forming machine comprises a control device to control the swabbing device in order to control the lubrication of the baffle. In one embodiment, the control device is configured for controlling the second nozzle and/or the first nozzle in order to control the spraying of lubricant. The control device may be configured for controlling a movement of at least a part of the swabbing device, in particular a spray bracket, in order to position the nozzles at desired positions for spraying lubricant.

In one embodiment, the control device is configured to control a drive of the baffle in order to move the baffle to the upper position. In particular, the drive of the baffle is an electric motor such as a servo motor. This embodiment ensures full control over the lubrication process. Thus, complete automation is enabled which leads to particularly reproducible and high-quality parison formation.

In a further embodiment, the glass forming machine is configured such that the baffle can be moved to a parking position beside the blank mould. The swabbing device may comprise a second nozzle to spray lubricant onto the baffle when the baffle is in the parking position. The second nozzle may be arranged on a side face of the spray bracket. A parking position is a position in which the baffle is placed when it is not used. This may be the case when a gob is inserted into the blank mould or when a parison is removed from the blank mould. The parking position may be a different lateral position than the blank mould, i.e. not vertically above or below the blank mould, and/or a different height position, e.g. on a higher position than the blank mould.

The parking position may also be provided in conventional glass forming machines without baffle lubrication. However, this embodiment enables to lubricate the baffle in the known position when the baffle is not used. Thus, an additional process step is not necessary to lubricate the baffle. No additional scrap is generated during the baffle lubrication. In addition, there is no need for an additional positioning of the baffle. Thus, a drive of the baffle does not have to be influenced for the baffle lubrication. In this embodiment, the drive is in particular a pneumatic drive.

In one configuration, the swabbing device comprises on a front-face side of the spray bracket a first nozzle to spray lubricant onto the blank mould and/or onto a neck ring of the blank station. The first nozzle can be arranged on a rod-shaped extension. A movement of the spray bracket may be required between the first spraying position, in which the second nozzle can spray lubricant onto the baffle, and one or more second spraying positions, in which the first nozzle can spray lubricant onto the blank mould and/or the neck ring.

In one configuration, a spray direction of the second nozzle and a spray direction of the first nozzle and/or a rod-shaped extension having the first nozzle form an angle greater than 20 degrees and/or smaller than 160 degrees, in particular greater than 60 degrees and/or smaller than 120 degrees and preferably approximately 90 degrees. The spray direction relates to the average spray direction of a nozzle independently of the spray angle covered by the nozzle. This facilitates moving the spray bracket with the extension in order to point the second nozzle to the baffle without the risk of mechanical interfering between the extension and the blank mould or other parts of the glass forming machine.

In one embodiment, the swabbing device is provided as a swab robot configured for multi-axle translational and/or rotational movement of at least one nozzle. The swab robot is configured to rotate the at least one nozzle around one or more axes and/or to translate the at least one nozzle along one or more axes. In total, a movement around at least two axes is possible. In particular, the swab robot is configured to move the spray bracket. Thus, a completely automated swab robot is provided which can automatically perform the desired lubrication operations together with the control device. This enables a particularly reproducible and, thus, high-quality parison formation.

In a further embodiment, the glass forming machine further comprises a blow station for forming the parison into a container. Additionally or alternatively, the glass forming machine comprises an invert mechanism which can move a neck ring from the blank station to the blow station. The forming of the parison into a finished product in the blow station may be accomplished in three phases: stretching of the parison under its own weight; inflation of the stretched parison; and extraction of the finished product. The blow station may comprise a blow mould which may consist of two blow mould halves. The blow station may include a blowing device to blow up a parison when the parison is in the blow mould. The blow station may include a suction device to assist blowing. The invert mechanism may include a servo-electric drive in order to transfer the neck ring. The neck ring transfer may be performed by a rotary motion.

In one configuration, the glass forming machine is configured such that lubricant can be sprayed onto the neck ring when the neck ring is in an intermediate position between the blank station and the blow station. Lubricating in an intermediate position prevents residues on any mechanism of the glass forming machine. It has been found that avoiding residues on any mechanism (especially a plunger mechanism) avoids the risk of creating container defects. In one configuration there are two intermediate positions. In the first intermediate position, the neck ring is swabbed from a front side. In the second intermediate position, the neck ring is swabbed from a back side.

In a further embodiment, the blank mould of the blank station consists of two blank mould halves, a neck ring consists of two neck ring halves and/or a blow mould of the blow station consists of two blow mould halves. The blank mould halves can be moved back and forth between an open position and a closed position. The neck ring may be arranged below the blank mould. The respective halves are movable between a closed and an opened position. The movement of the halves may be a translational movement and/or a horizontal movement. The technical effort required to manufacture a container can thus be kept to a low level.

In one configuration, the blank station comprises a plurality of blank moulds and baffles and, if applicable, of neck rings. Thus, a plurality of parisons can be formed simultaneously. The single blank moulds, baffles and, if applicable, neck rings are in particular arranged linearly. In particular, only one swabbing device such as a swab robot is provided for a plurality of said components. The swabbing device may comprise a plurality of first nozzles, and/or second nozzles, wherein the first nozzles and the second nozzles are in particular arranged linearly. Said first nozzles may be arranged on respective extensions. The nozzles may be arranged on a plurality of interconnected spray brackets or on a single spray bracket. Thus, a plurality of baffles and, if applicable, of blank moulds and/or neck rings can be lubricated with a single movement of the swabbing device. Said lubrications may be performed simultaneously. In one configuration, the glass forming machine comprises a plurality of blank stations and a plurality of blow stations. The swabbing device may be configured to lubricate baffles and in particular also blank moulds and/or neck rings of the plurality of blank stations.

A further aspect of the invention is a method for lubricating a baffle of a glass forming machine. The glass forming machine comprises a blank station with a blank mould for forming a parison from a gob of molten glass inside the blank mould. The glass forming machine further comprises the baffle. The method comprises spraying lubricant onto the baffle. All features, advantages and configurations of the glass forming machine disclosed above can also be applied to the method and vice versa.

In one embodiment, lubricant is sprayed onto the neck ring by means of a first nozzle arranged on a rod-shaped extension, while the first nozzle is arranged inside the blank mould. In particular, the blank mould is in the open position for lubricating the neck ring. Lubricant is sprayed onto the baffle by means of a second nozzle while the first nozzle is arranged inside the blank mould. Spraying by means of the second nozzle and the first nozzle are performed at the same time or subsequently.

In particular, the method further comprises, as a first step, spraying lubricant onto the inner wall of the blank mould, e.g. by means of the first nozzle. In particular, at the same time the first nozzle moves downwards within the blank mould. In particular, the spray head is moved with respect to the blank mould. This serves for uniformly lubricating the neck ring. The blank mould is in particular closed. In particular, spraying lubricant onto the neck ring is performed as a following second step. The first nozzle may be moved and/or may be stopped during the spraying of lubricant onto the neck ring. The baffle may be moved to an upper position vertically above the blank mould, which may be performed at the same time.

In particular, spraying lubricant onto the baffle is performed as a third step which may be performed after the second step or simultaneously at least for a period of time. Thus, a certain movement of the nozzles and/or the spray bracket may be performed between spraying lubricant onto the neck ring and the baffle. However, the movement, if any, is kept at a very low level. Thus, no additional disturbance to the parison and/or container forming process other than the disturbance caused by the normal automatic swab cycle is performed.

In a further embodiment, lubricant is sprayed onto the baffle by means of a second nozzle while the baffle is in a parking position beside the blank mould. A spray bracket of the swabbing device on which a first nozzle is mounted is moved such that the first nozzle plunges into the blank mould. Lubricant is sprayed onto the blank mould and/or onto a neck ring of the glass forming machine by means of the first nozzle. In particular, the movement of the spray bracket is performed after spraying lubricant onto the baffle. In particular, spraying lubricant onto the blank mould and/or onto a neck ring is performed afterwards. During the spraying of lubricant onto the blank mould and/or onto a neck ring the first nozzle may move inside the blank mould. In particular, the blank mould is in the open position for lubricating the neck ring.

Using the mentioned embodiments, it is possible to perform all lubrication operations with one single swabbing device. In addition, the normal automatic cycles are not disturbed and the parison output remains the same.

Another aspect of the invention is a computer program comprising instructions which, when the program is executed by a computer, cause the computer to carry out the steps of the method according to the invention. The computer is in particular a control device of a glass swabbing device and/or of a glass forming machine.

Another aspect of the invention is a swabbing device for a glass forming machine, the glass forming machine comprising a blank station with a blank mould for forming a parison from a gob of molten glass inside the blank mould and a baffle for closing the blank mould, wherein the swabbing device is configured to spray lubricant onto the baffle for lubricating the baffle. All features, advantages and configurations of the swabbing device disclosed above can also be applied to this aspect of the invention.

BRIEF DESCRIPTION OF THE DRAWINGS

The invention is illustrated with the aid of the following examples, with reference to the appended drawings in which.

DETAILED DESCRIPTION

FIGS. 1 to 5 illustrate the production of a glass bottle. FIGS. 6 to 9 illustrate the swabbing or lubrication of parts of the blank station.

Figure 1:
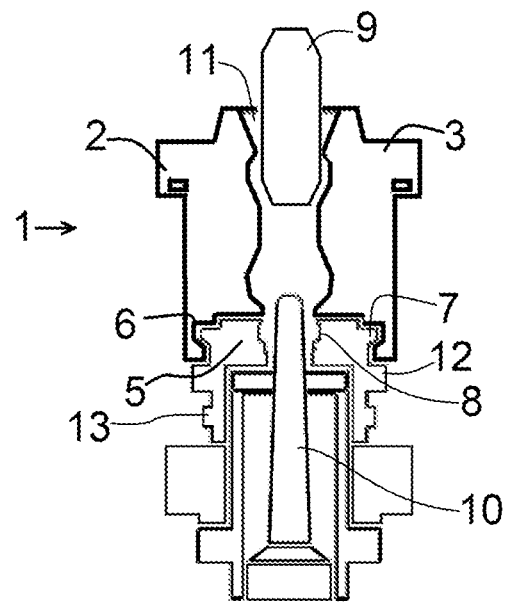
FIG. 1 is a schematic representation of a blank station at the beginning of the production of a parison.

FIG. 1 refers to a blank station of a glass forming machine. FIG. 1 shows one blank mould 1 of the blank station. The blank mould 1 consists of two blank mould halves 2 and 3. The blank mould halves 2 and 3 are in a closed position. The two blank mould halves 2 and 3 are closed up on a neck ring 5 at the lower end of the blank mould 1. The blank mould 1 has an upper opening 11 on its upper side. As shown in FIG. 1, a gob of molten glass 9 can be brought into the blank mould 1 from above through the upper opening 11 by gravity.

There is an annular recess 6 formed by the two halves 2, 3 when the two halves 2 and 3 are in their closed position. The neck ring 5 comprises an upper annular projection 7. The upper annular projection 7 extends into the annular recess 6 when the two halves 2, 3 are in their closed position. In the closed position of the two halves 2, 3, these are then fixed by positive locking with the neck ring 5.

Figure 3:
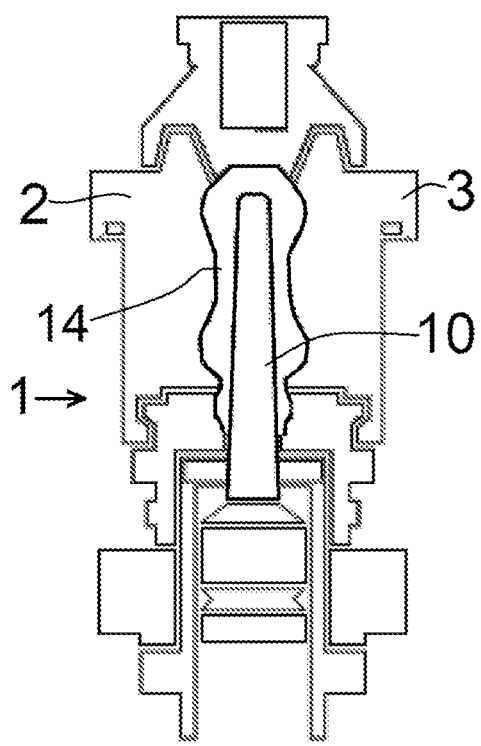
FIG. 3 is a schematic representation of the blank station at the end of the production of a parison.

The inner wall of the neck ring 5 can have a bulge 8. A parison 14 can be held by this bulge 8, as shown in FIG. 3.

The blank station includes a plunger 10. According to FIG. 1, the plunger 10 is in an initial position. The plunger 10 reaches through the neck ring 5. The plunger 10 tapers in the direction of the mould 1. When the plunger 10 is in the initial position the plunger 10 ends close to the bottom of the mould 1 as well as above the bottom of the mould 1 as shown in FIG. 1.

The neck ring 5 can include a flange 12 on which the mould 1 can rest. Further, the neck ring 5 can include a lower annular projection 13 in order to be able to connect the neck ring 5 positively with an arm of an invert mechanism.

Figure 2:
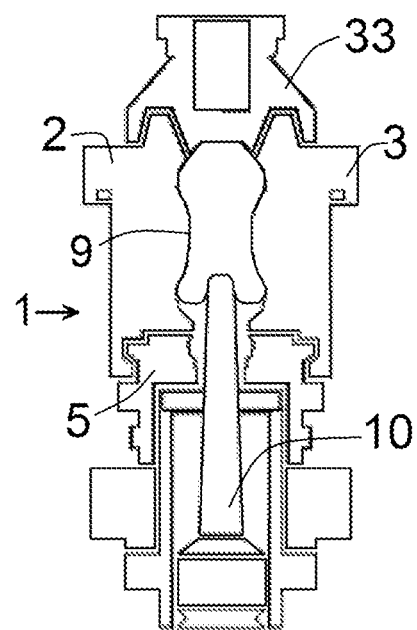
FIG. 2 is a schematic representation of the blank station during the production of a parison.

As soon as the gob of molten glass 9 is completely in the mould 1, the upper opening 11 of the mould 1 is closed by a baffle 33 as shown in FIG. 2. After the upper opening 11 has been closed, the plunger 10 is moved upwards, i.e. further into the mould 1. This upward movement of the plunger 10 is illustrated in FIGS. 2 and 3. The gob of molten glass 9 thus becomes a parison 14 inside the blank mould 1. The parison 14 is shown in FIG. 3.

Once the parison 14 has been formed, the mould 1 is opened. The baffle 33 and the two halves 2 and 3 of the mould 1 are removed from the parison 14. The parison 14 remains on the neck ring 5. In particular, the parison 14 is held by the bulge 8 of the neck ring 5. For example, the baffle 33 is removed from or pulled out of the parison 14 first. After that the two halves can be moved away into the open position.

Figure 4:
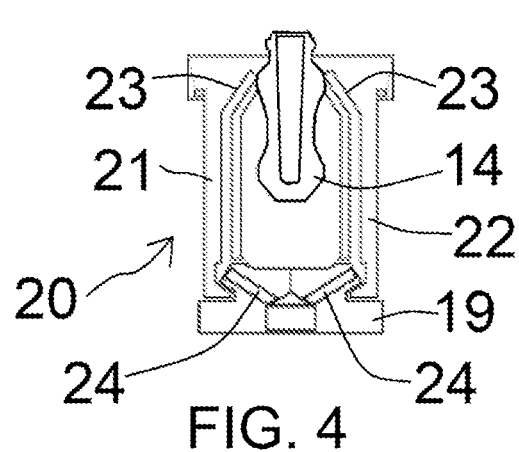
FIG. 4 is a schematic representation of a blow station at the beginning of the production of a glass bottle.
Figure 5:
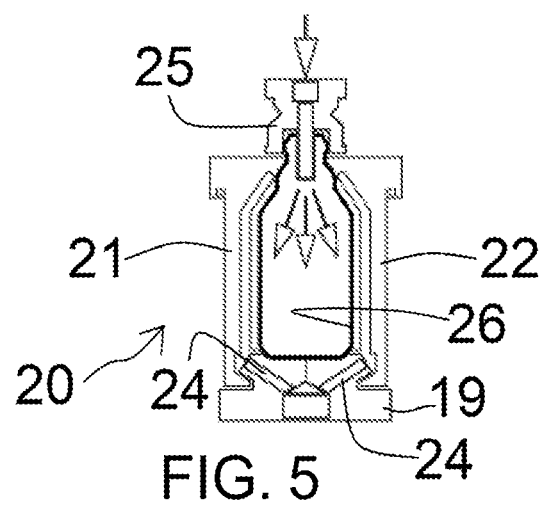
FIG. 5 is a schematic representation of the blow station at the end of the production of the glass bottle.

Then, an invert mechanism may transfer the neck ring together with the parison to the blow station A gripper of the invert mechanism may then grip for example the lower projection 13 of the neck ring 5. The gripper may be attached to an L-shaped arm of the invert mechanism. The L-shaped arm can be rotated about one axis, e.g. by means of a motor. After the gripper has gripped the neck ring 5, the L-shaped arm may be rotated by 180 degrees around the axis. When the neck ring 5 is rotated by 180 degrees, the parison is transported from the blank station to the blow station and is rotated by 180 degrees. The parison 4 may thus be brought to a base 19 of a blow station 20 which is shown in FIGS. 4 and 5. The parison 14 is then located above this base 19. However, in contrast to FIG. 4, the blow mould halves 21 and 22 of the blow mould may be in an opened position when the parison 4 is brought into the blow station 20.

After the parison 14 has been brought to the base 19, the two halves 21 and 22 may be moved to the parison 14 into the shown closed position. Then, the parison 14 is inside the blow mould 21, 22 as shown in FIG. 4. When the parison 14 is inside the blow mould 21, 22, the neck ring 5 may be removed. To do this without damaging the parison 14, the neck ring 5 also consists of two halves. The two halves of the neck ring 5 can therefore be removed from each other to remove the neck ring 5 from the parison 14.

The two halves 21 and 22 comprise a double wall. A gap 23 remains between the two walls of the double wall. The inner wall of the double wall is perforated or otherwise air-permeable. The base 19 comprises ducts 24 through which air can be sucked out of each gap 23.

A blow head 25 is then placed on the two halves 21 and 22 of the blow mould. Air is then pumped through the blow head 25, inflating the parison into a bottle 26, as shown in FIG. 5. Inflating can be supported by sucking air through the ducts 24. After the bottle 26 has been inflated, the blow head as well as the two halves 21 and 22 of the blow mould are removed. The bottle 26 can then be gripped by a take-out and placed on a conveyor belt, for example.

Figure 6:
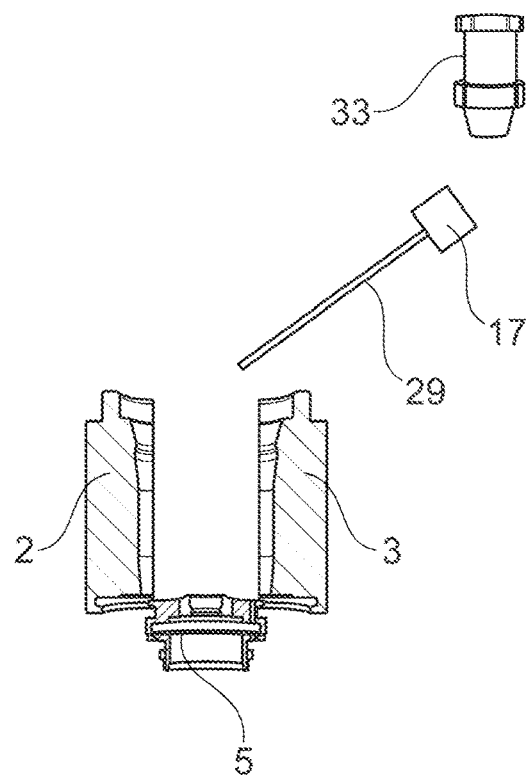
FIG. 6 is a schematic representation of a blank station with a baffle before lubrication of the baffle.

FIG. 6 shows the blank mould with the two halves 2, 3 in an open position. The neck ring 5 is positioned below the blank mould. The baffle 33 is in a parking position where it is positioned when it is not used. A part of a swabbing device is shown, namely a spray bracket 17 having a rod-shaped extension 29. The face of the spray bracket 17 on which the extension 29 is attached is defined as the front face of the spray bracket 17. The spray bracket 17 may be rotated around one or more axes and/or translated along one or more axes in by a moving apparatus of the swabbing device. Thus, the swabbing device is configured as a swab robot.

Figure 8:
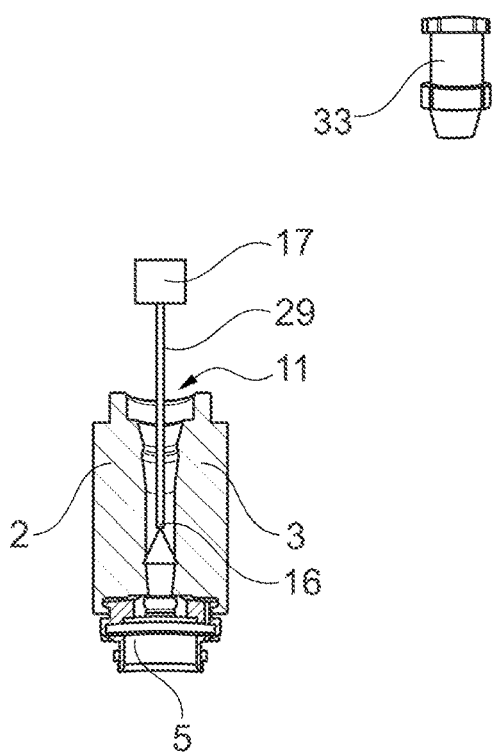
FIG. 8 is a schematic representation of a blank station during lubrication of the blank mould.

There is a first nozzle at the free end of the extension 29. Thus, the first nozzle is located on the front-face side of the spray bracket 17. The first nozzle serves for lubricating the blank mould and/or the neck ring 5, as shown in FIGS. 8 and 9.

Figure 7:
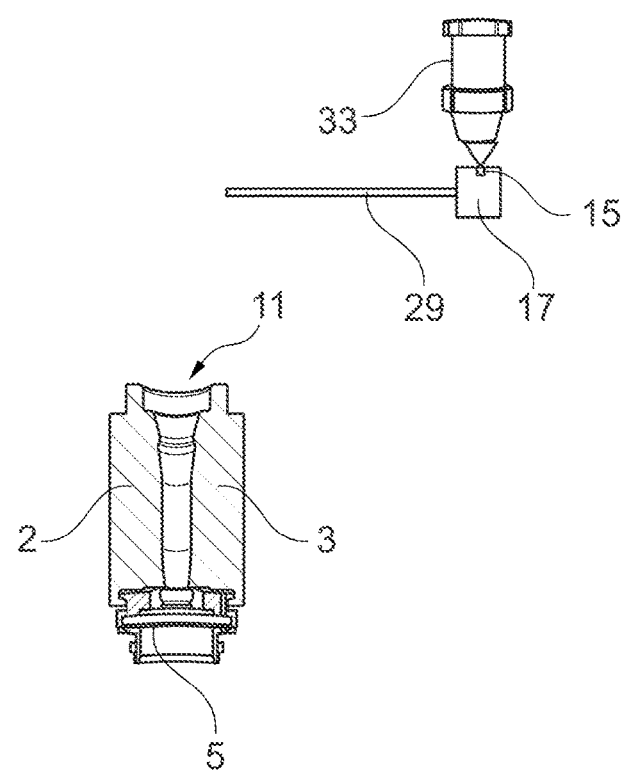
FIG. 7 is a schematic representation of a first variant for lubricating the baffle.

In one variant shown in FIG. 7, the baffle 33 is lubricated in the parking position which is also referred to as up position. For this purpose, the spray bracket 17 has a second nozzle 15 on the side face. The second nozzle may be arranged on another extension (not shown) on the respective face of the spray bracket 17 or flush with the housing of the spray bracket 17. A triangle at the nozzle 15 shows the spraying of the lubricant.

After the baffle 33 has been lubricated, the blank mould and the neck ring may be lubricated. Lubrication of the blank mould is shown in FIG. 8. The spray bracket 17 moves downwards, while the first nozzle 16 sprays lubricant in axial and radial directions. After the blank mould has been lubricated, the blank mould halves 2 and 3 are opened and the neck ring 5 may be lubricated. The upper surface of the neck ring as well as the circumferential inner surface of the neck ring may be lubricated in this way. For lubricating the upper surface, the distance between the first nozzle 16 and the neck ring is large enough so that the predetermined spray angle of the first nozzle 16 sprays lubricant onto the desired region.

Figure 9:
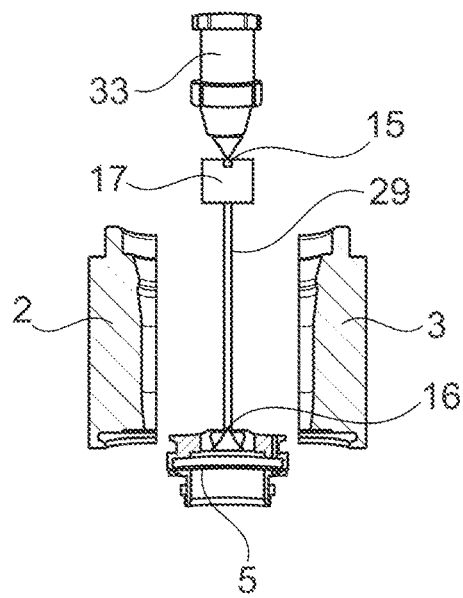
FIG. 9 is a schematic representation of a second variant for lubricating the baffle.

FIG. 9 shows a second variant in which the baffle 33 is lubricated in an upper position which is also referred to as up position. The upper position is vertically above the blank mould. For this purpose, in contrast to FIG. 7, the spray bracket 17 has a second nozzle 15 on the back face. Although both processes are shown simultaneously in FIG. 9, lubrication of the baffle 33 is typically performed after lubrication of the neck ring 5. Lubrication of the blank mould, as shown in FIG. 8, may be performed before lubrication of the neck ring 5.

Figure 10:
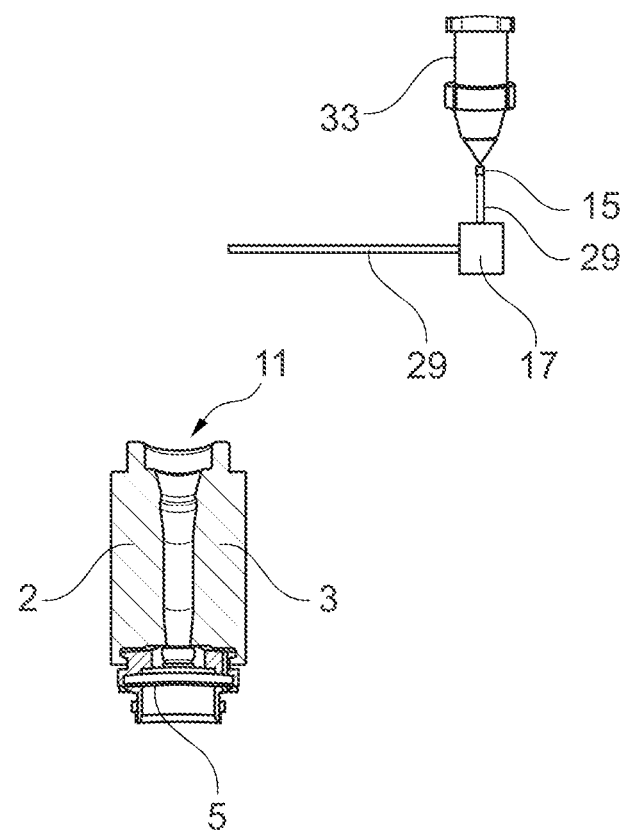
FIG. 10 is a modified version of the variant shown in FIG. 7.

The variant shown in FIG. 10 differs from the variant shown in FIG. 7 in that also the second nozzle 15 is attached to the spray bracket 17 by means of an extension 29. Such an extension 29 can be used in any embodiment of the invention. This can facilitate reaching the desired spray position.

For lubrication, in general, a lubricant such as oil may be pumped through the extension 29 which may be realized as a tube. In this way, the respective item may be sprayed with the lubricant. This creates a spray mist that reaches the surface to be lubricated. Alternatively or additionally, the lubricant can be deflected at the end of the extension 29. In particular, the swabbing device is configured for an independent spray timing of the different nozzles.

LIST OF REFERENCE SIGNS

Blank mould 1
Blank mould halves 2, 3
Neck ring 5
Annular recess 6
Upper annular projection 7
Bulge 8
Gob of molten glass 9
Plunger 10
Upper opening 11
Flange 12
Annular projection 13
Parison 14
Second nozzle 15
First nozzle 16
Spray bracket 17
Base 19
Blow station 20
Blow mould halves 21, 22
Gap 23
Duct 24
Blow head 25
Bottle 26
Extension 29
Baffle 33

What is claimed is:

1. A glass forming machine comprising a blank station with a blank mould for forming a parison from a gob of molten glass inside the blank mould and a baffle for closing the blank mould, wherein the glass forming machine further comprises a swabbing device which is configured to spray lubricant onto the baffle for lubricating the baffle, wherein the swabbing device comprises a spray bracket with at least one nozzle and/or with a rod-shaped extension having a nozzle, wherein the glass forming machine is configured such that the baffle can be moved to an upper position vertically above the blank mould, wherein the swabbing device comprises, on a back face of the spray bracket, a nozzle of the at least one nozzle to spray lubricant onto the baffle when the baffle is in the upper position.

2. The glass forming machine according to claim 1, wherein the swabbing device is further configured to spray lubricant onto the blank mould for lubricating the blank mould.

3. The glass forming machine according to claim 2, wherein the swabbing device comprises a rod-shaped extension with another nozzle of the at least one nozzle, the rod-shaped extension being configured for plunging into the blank mould for spraying lubricant onto an inner wall of the blank mould.

4. The glass forming machine according to claim 1, wherein the glass forming machine comprises a neck ring and the swabbing device is further configured to spray lubricant onto the neck ring for lubricating the neck ring.

5. The glass forming machine according to claim 1, wherein the swabbing device comprises on a front-face side of the spray bracket another nozzle of the at least one nozzle to spray lubricant onto the blank mould and/or onto a neck ring of the blank station.

6. The glass forming machine according to claim 5, wherein the glass forming machine comprises a control device to control the swabbing device in order to control the lubrication of the baffle, wherein the control device is configured to control a drive of the baffle in order to move the baffle to the upper position.

7. The glass forming machine according to claim 1, wherein the swabbing device is provided as a swab robot configured for multi-axle translational and/or rotational movement of at least one nozzle.

8. The glass forming machine according to claim 1, wherein the glass forming machine further comprises a blow station for forming the parison into a container and/or an invert mechanism which can move a neck ring from the blank station to the blow station.

9. The glass forming machine according to claim 1, wherein the blank mould of the blank station consists of two blank mould halves, a neck ring consists of two neck ring halves, and/or a blow mould of a blow station consists of two blow mould halves.

10. A swabbing device for a glass forming machine, the glass forming machine comprising a blank station with a blank mould for forming a parison from a gob of molten glass inside the blank mould and a baffle for closing the blank mould, wherein the swabbing device is configured to spray lubricant onto the baffle for lubricating the baffle,
wherein the swabbing device comprises a spray bracket with at least one nozzle and/or with a rod-shaped extension having a nozzle;
wherein the glass forming machine is configured such that the baffle can be moved to an upper position vertically above the blank mould, wherein the swabbing device comprises on a back face of the spray bracket a nozzle of the at least one nozzle to spray lubricant onto the baffle when the baffle is in the upper position, or
wherein the glass forming machine is configured such that the baffle can be moved to a parking position beside the blank mould, wherein the swabbing device comprises on a side face of the spray bracket one nozzle of the at least one nozzle to spray lubricant onto the baffle when the baffle is in the parking position.

11. The glass forming machine according to claim 10, wherein the swabbing device comprises on a front-face side of the spray bracket another nozzle of the at least one nozzle to spray lubricant onto the blank mould and/or onto a neck ring of the blank station.

12. A glass forming machine comprising a blank station with a blank mould for forming a parison from a gob of molten glass inside the blank mould and a baffle for closing the blank mould, wherein the glass forming machine further comprises a swabbing device which is configured to spray lubricant onto the baffle for lubricating the baffle, wherein the swabbing device comprises a spray bracket with at least one nozzle and/or with a rod-shaped extension having a nozzle, wherein the glass forming machine is configured such that the baffle can be moved to a parking position beside the blank mould, wherein the swabbing device comprises, on a side face of the spray bracket, one nozzle of the at least one nozzle to spray lubricant onto the baffle when the baffle is in the parking position.

* * * * *